United States Patent [19]

Jenkins et al.

[11] Patent Number: 4,751,793
[45] Date of Patent: Jun. 21, 1988

[54] FREIGHT CAR DOOR CONSTRUCTION

[75] Inventors: Oliver J. Jenkins, Youngstown; Glenn L. Wright, Canfield, both of Ohio

[73] Assignee: The Youngstown Steel Door Company, Youngstown, Ohio

[21] Appl. No.: 20,032

[22] Filed: Feb. 27, 1987

Related U.S. Application Data

[63] Continuation of Ser. No. 655,899, Sep. 28, 1984, abandoned.

[51] Int. Cl.$^4$ .............................................. E06B 3/00
[52] U.S. Cl. ........................................ 49/501; 49/503; 52/814
[58] Field of Search ................... 49/501, 503; 292/210, 292/282; 52/814

[56] References Cited

U.S. PATENT DOCUMENTS

| | | | |
|---|---|---|---|
| 858,679 | 7/1907 | Tatum | 292/282 |
| 907,990 | 12/1908 | Gill | 292/282 |
| 1,240,634 | 9/1917 | Williams | 52/814 |
| 1,513,363 | 10/1924 | Barrows | 52/814 |
| 1,560,526 | 11/1925 | Barrows | 49/501 X |
| 1,689,472 | 10/1928 | Barrows | 49/501 |
| 1,902,546 | 3/1933 | Ditchfield | 52/814 X |
| 2,045,291 | 6/1936 | Busse | |
| 3,886,687 | 6/1975 | Hesch et al. | 49/503 |
| 4,030,246 | 6/1977 | Naylor | 49/501 |
| 4,182,080 | 1/1980 | Naylor | 49/501 X |
| 4,290,232 | 9/1981 | Shook | |
| 4,353,187 | 10/1982 | Jenkins, Jr. et al. | 49/501 |
| 4,423,896 | 1/1984 | Loomis | |

*Primary Examiner*—Philip C. Kannan
*Attorney, Agent, or Firm*—Fay, Sharpe, Beall, Fagan, Minnich & McKee

[57] ABSTRACT

A rail car sliding door includes a substantially rectangular frame having a pair of side frame members and top and bottom frame members which are secured to each other. At least one corrugated panel is secured to the frame. Top, bottom and side reinforcing channels are secured to a respective one of the frame members for door strengthening purposes. The top and bottom reinforcing channels extend over the side reinforcing channels to the door side edges for better bearing loads imposed on the door. The door may advantageously be provided with a corrugated metal panel in which substantially equal amounts of panel material are provided on each side of a plane which bisects the door thickness dimension. The door also may advantageously be provided with a hasp which is secured to the door by means of a U-shaped hasp securing member.

19 Claims, 4 Drawing Sheets

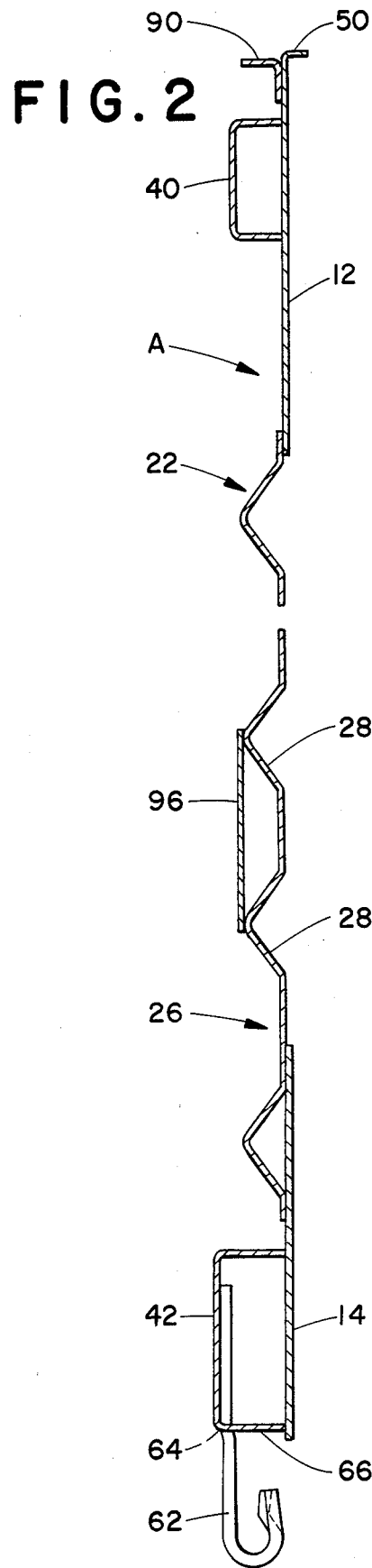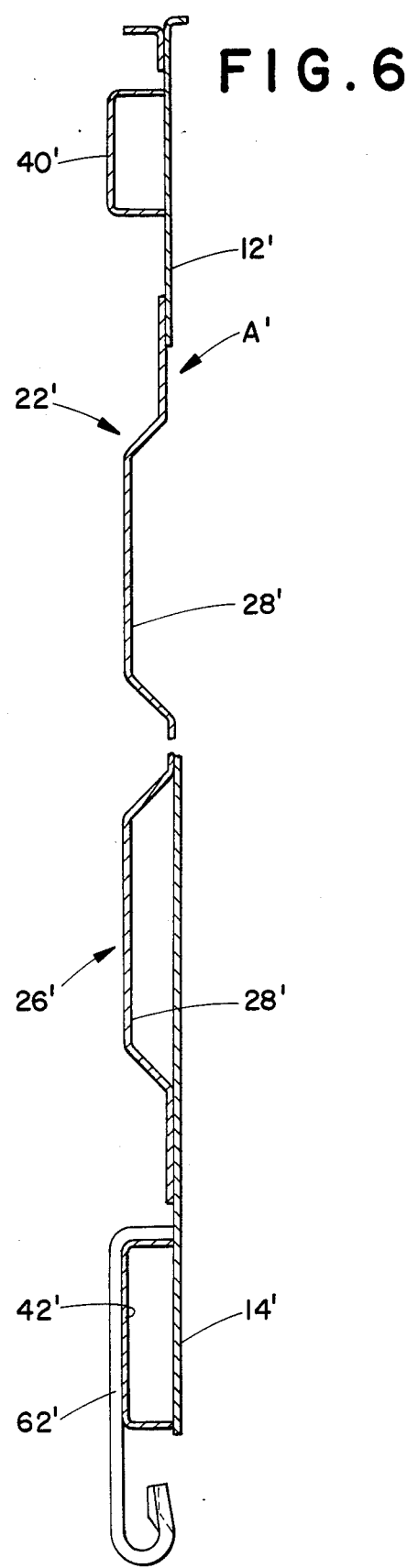

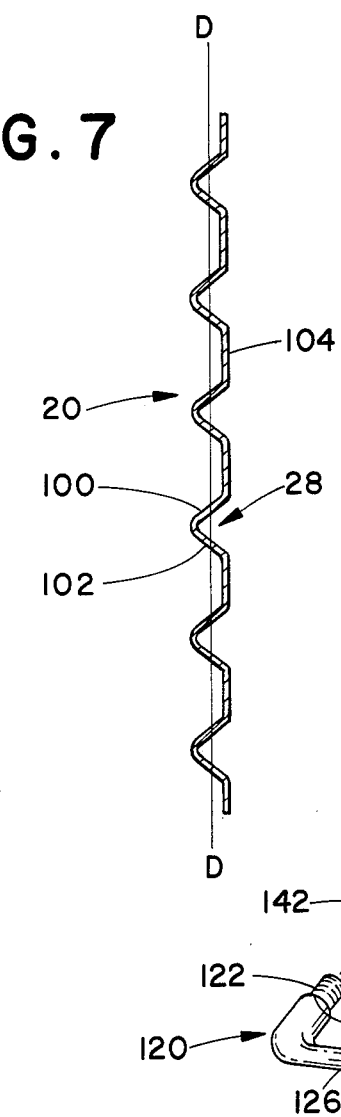
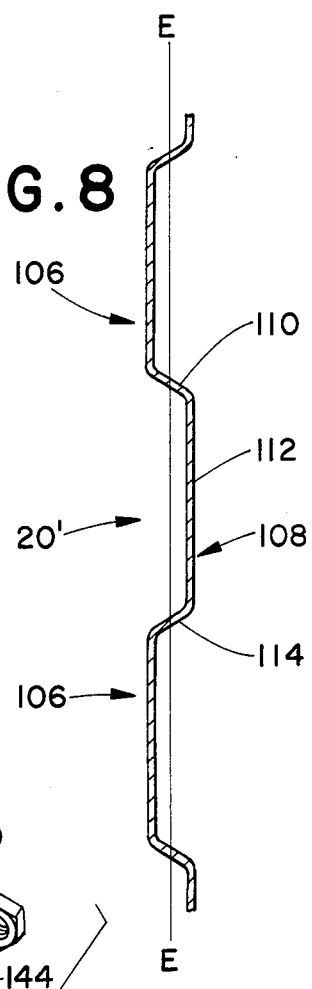
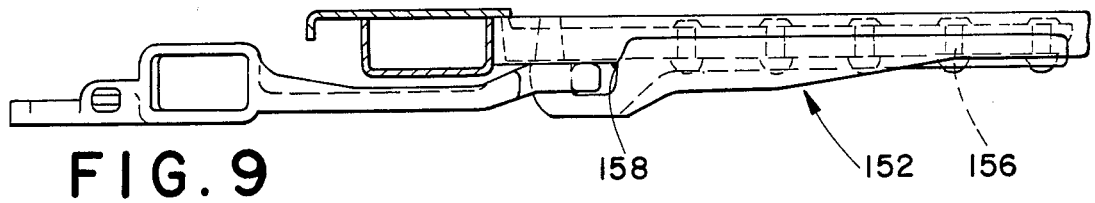
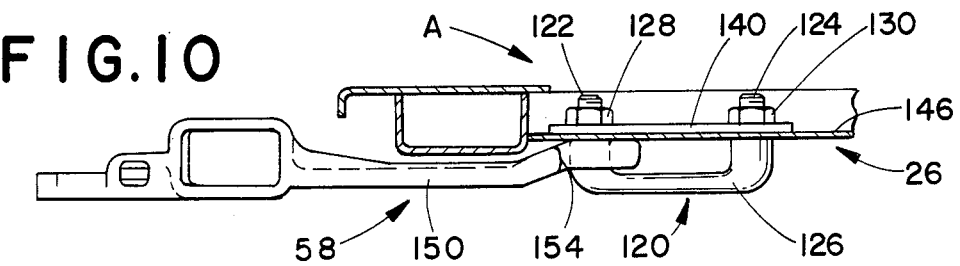

FREIGHT CAR DOOR CONSTRUCTION

This is a continuation of co-pending application Ser. No. 655,899 filed on Sept. 28, 1984, now abandoned.

BACKGROUND OF THE INVENTION

The present invention relates to a door construction. More specifically, the invention is directed to a door which is slidable between open and closed conditions.

The invention is particularly applicable to corrugated metal doors of the type used on railway freight cars and will be particularly described with reference thereto. However, it will be appreciated by those skilled in the art that the invention has broader applications and is adaptable to use on doors of other types and in other environments.

Rectangular metal doors of a known type used on railroad cars include a generally rectangular frame having top, bottom, and opposed side door frame members. Corrugated metal panels are secured to these frame members for completing the basic door construction. In most conventional railway cars, the frame members and corrugated panels are riveted together. However, the manufacture of riveted door constructions is very time consuming and can take anywhere from two to three weeks from start to finish.

It has been determined that a welded car door is much more efficient to manufacture since it only takes approximately one-half the time of a riveted door. This result occurs because the number of fabricating steps or operations is reduced. Even the known welded rail car doors, however, are not adequately reinforced to enable them to absorb the impact loads to which a railway car door is typically subjected.

Moreover, conventional rail car doors, whether riveted or welded, also are not sufficiently sturdy to withstand internally applied loads. Theoretically, car doors are not intended or supposed to be internally loaded. However, when cargo shifts inside the rail car, it can and does internally load the doors. For this reason, it has been considered desirable to stiffen rail car doors for enabling them to bear various internal loads which are sometimes imposed thereon.

Sliding doors of conventional railroad freight cars are typically held closed by an elongated hasp which is rotatably mounted near the leading edge of one sliding door, and extends beyond the door to engage a locking mechanism mounted on the door jamb or on a second sliding door. The hasp is usually mounted through an eye at one end thereof which is positioned in a hasp fastener thus enabling the hasp to rotate both horizontally and vertically about the fastener. Since these door hasps are subjected to a good deal of punishment and damage in ordinary use, it is often necessary to replace them.

Conventional hasp fasteners are secured to rail car doors by rivets and welds. With this type of construction, it becomes necessary to chisel off the heads of the rivets to remove the hasp fastener and damaged hasp, and then re-rivet the fastener to the door when the new hasp has been installed. Alternately, the eye of the broken hasp can be cut open with a torch. In this case, the replacement hasp also has to be cut open, positioned around the hasp fastener, twisted back into shape and re-welded. Yet another method of removing broken hasps is to cut the link of the hasp fastener for allowing removal of the damaged hasp. A new hasp is then substituted, and the link member is bent back into shape and re-welded. As is evident, all of these replacement methods are very time consuming and serious disadvantages may arise with regard to the quality of the connection of the hasp to the fastener or of the fastener to the door.

A more recent hasp replacement method utilizes a kit including a member which partially defines a hasp eye and is sized to fit loosely about the existing hasp retaining link. An eye completion member is arranged to mate with the first member to form a replacement hasp when affixed thereto by welding. Together, these two members form a replacement hasp by positioning the partial eye defining member about the link, mating the eye completion member therewith, and then welding the two members together. However, this method necessitates use of a more expensive two component hasp member in place of the conventional, and less expensive, one-piece hasp.

Accordingly, it has been considered desirable to develop a new and improved rail car door and a hasp assembly therefor which would overcome the foregoing difficulties and others while providing better and more advantageous overall results.

BRIEF SUMMARY OF THE INVENTION

In accordance with the present invention, a new and improved rail car sliding door is provided.

More particularly in accordance with the invention, the door includes a substantially rectangular frame having a pair of side frame members and top and bottom frame members which are secured to each other. At least one corrugated panel is secured to the frame. Top, bottom and side reinforcing channels are each secured to a respective one of the frame members to strengthen the door. The top and bottom reinforcing channels extend over the side reinforcing channels to the door side edges to better bear loads imposed on the door. In the preferred construction, the frame members and the at least one corrugated panel are welded to each other for providing a rigid door construction.

According to another aspect of the invention, the corrugated panel has a plurality of corrugations extending horizontally thereacross from one side edge to the opposing side edge.

In accordance with another aspect of the invention, the bottom frame member overlaps and is secured to a lowermost corrugation of the panel to provide a second reinforcing channel along the bottom portion of the door.

According to yet another aspect of the invention, an elongated plate may be secured to one of the door panel corrugations to define a reinforcing or strengthening channel across the door.

According to still another aspect of the invention, the panel corrugations are advantageously configured so that equal amounts of panel material are disposed on each side of a plane which bisects the door thickness dimension.

In accordance with a further aspect of the invention, an easily replaceable hasp assembly for a rail car door includes a movable hasp having an eye portion as well as a link which passes through the hasp eye. The link is attached at both its ends to the door and has threaded end portions which extend through the door. Fastening means adapted to be threadedly received on the link end portions are employed to secure the link, and hence the hasp, to the door.

In accordance with a still further aspect of the invention, the link is preferably U-shaped and has a central portion with a larger diameter than the threaded end portions. Also, it is preferred that the fastening means be located on an inner side of the door to render the assembly pilfer proof.

The principal advantage of the present invention is the provision of a strengthened rail car door which can better withstand the stresses of every day usage.

Another advantage of the invention resides in the provision of such a door which is easier to manufacture.

A further advantage of the invention is the provision of a new rail car door which is balanced for enhancing its strength characteristics.

Yet another advantage of the invention is the provision of an easily replaceable hasp assembly for a rail car door.

Still other benefits and advantages of the invention will become apparent to those skilled in the art upon a reading and understanding of the following detailed description.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein:

FIG. 2 is a cross-sectional view taken along lines 2—2 of FIG. 1;

FIG. 6 is a cross-sectional view similar to FIG. 2 for showing an alternate embodiment of a rail car door formed according to the present invention;

FIG. 7 is a cross-sectional view through a portion of a corrugated panel member used in the rail car door of FIG. 1;

FIG. 8 is a cross-sectional view through a corrugated panel member used in the rail car door of FIG. 6;

FIG. 9 is a plan view of a conventional hasp assembly secured to a rail car door;

FIG. 10 is a plan view similar to FIG. 9 of a hasp assembly formed according to the present invention and secured to a rail car door; and, FIG. 11 is an exploded perspective view showing the hasp fastener portion used in the hasp assembly of FIG. 10.

DETAILED DESCRIPTION OF THE PREFERRED AND ALTERNATE EMBODIMENTS

Figure 1:
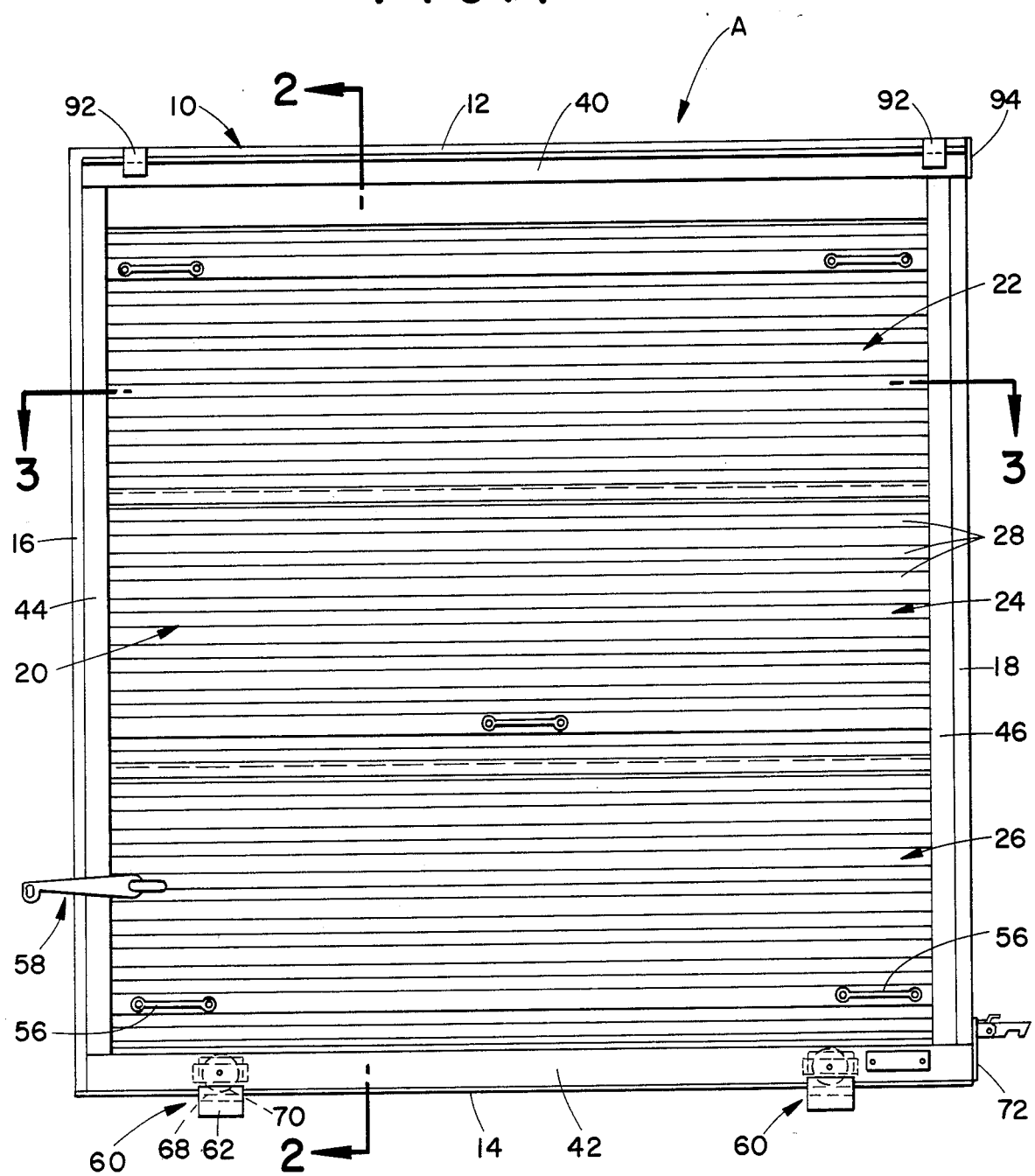
FIG. 1 is a front elevational view of a rail car door constructed according to the present invention.

Referring now to the drawings, wherein the showings are for purposes of illustrating preferred and alternate embodiments of the invention only and not for purposes of limiting same, FIG. 1 shows the subject new sliding door A. While this door is primarily designed for and will hereinafter be described in connection with a conventional freight type railway car, it will be appreciated that the overall inventive concept could be adapted to use in other environments.

More particularly, the door A includes a frame 10 comprised of opposed top and bottom frame members 12, 14, and opposed first and second side frame members 16, 18. The four frame members preferably comprise planar metal sheets which are secured to each other by welding. A corrugated metal panel assembly 20 is secured, also by welding, to the frame 10 to complete the door.

In the embodiment of FIG. 1, the panel assembly 20 includes top, center and bottom panel members 22, 24, 26 which are welded to each other along adjoining edges. It should be recognized, however, that a larger or smaller number of panel members could be utilized as may be desirable for a particular application. Each of the panels 22, 24, 26 is provided with a plurality of laterally spaced apart corrugations 28 which extend horizontally of the door between side frame members 16, 18.

All rail car door panels initially comprise flat metal sheets which are processed through a die operation to form the corrugations. With conventional panels, however, the corrugations could not extend out to the panel edges since the edges needed to be flat for riveting purposes. Thus, the die to make such panels did not draw evenly, and a second die operation was necessary to trim the edges of the panel evenly and to place rivet holes in the edges. In contrast to the corrugated panels of the prior art, the panel members 22, 24, 26 of the present invention have corrugations which extend completely across each panel from one side edge to the other so that there is no need for a second die operation. Also, since the panels of the present invention are welded to the frame, there is no need to incorporate rivet receiving holes in the panel edges.

The door of the present invention additionally includes a plurality of box beam type stiffening members in the form of U-shaped channels which strengthen the door. In this connection, a top reinforcing channel 40 is secured to the top frame member 12 and a bottom reinforcing channel 42 is secured to the bottom frame member 14. Similarly, a first side reinforcing channel 44 is secured to the first side frame member 16 and a second side reinforcing channel 46 is secured to the second side frame member 18. These box beam reinforcing channels preferably are welded to the door frame members to stiffen the door considerably and enable it to better resist those loads encountered in every day use.

It should be noted that the top and bottom reinforcing channels 40, 42 extend over the side reinforcing channels 44, 46 substantially to the door side edges to provide better load bearing capabilities. Generally, such loads are better able to be borne and transmitted by reinforcing channels which extend completely across the door width as is the case with top and bottom reinforcing channels 40, 42 of the present invention. For this reason, the side reinforcing channels 44, 46 only extend vertically a distance which is sufficient to meet the top and bottom reinforcing channels 40, 42.

Unlike the prior art door constructions, since the frame members 12, 14, 16, 18 of the present invention are planar (FIGS. 2 and 3) and are not riveted to the reinforcing channels 40, 42, 44, 46, which themselves are unitary, the gauge or thickness of the reinforcing channels can be changed without having to alter the frame members in any way. In the same manner, the gauge of the frame members can be changed independently of the reinforcing channels. In other words, the present invention provides a two-piece built-up door in which the material gauge of either the frame members or the reinforcing channels can be individually changed without affecting the other members. This is in contrast to the multi-member riveted doors of the prior art in which a change in one member usually necessitates changes in adjacent members. It thus becomes easier to manufacture a door designed to fit a particular rail car environment without a need to readjust the stamping or forming dies through which the door panel members are usually processed.

Figure 3:
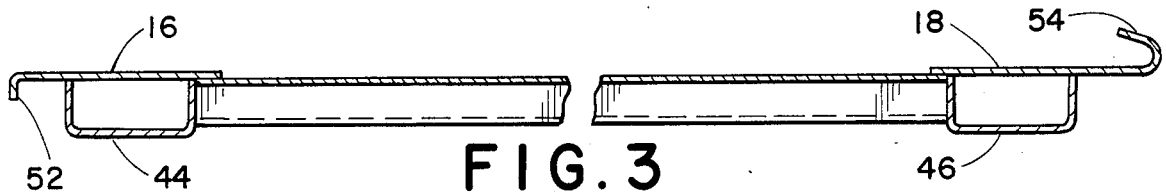
FIG. 3 is a cross-sectional view taken along lines 3—3 of FIG. 1.

The top frame member 12 is provided with a rearwardly bent portion 50 (FIG. 2), while the side frame members 16, 18 of the door are respectively provided with a forwardly bent portion 52 and a rearwardly bent hook shaped portion 54 (FIG. 3). The bottom panel 14 is not bent. Bent frame portions 50, 52, 54 are necessary since door manufacturers need to meet the rail car manufacturer's specifications along the four edges of the door in order to adapt the door to the opening provided in the car and to the door sliding structure provided on the car.

Referring again to FIG. 1, a plurality of conventional handles 56 are secured to the panel assembly 20 for moving the door. Also, a hasp assembly 58 is provided for locking the door as is known. Roller assemblies 60 are positioned along the bottom edge of the door to enable the door to slide on an associated rail (not illustrated) installed on the rail car.

With reference also to FIG. 2, the bottom reinforcing channel 42 has secured therein as by welding bottom retainer members 62 which extend through suitable apertures 64 in a bottom wall 66 of the channel 42. Suitable openings 68 are provided in the bottom wall 66 so that rollers 70 of roller assemblies 60 can protrude therethrough for supporting the door on a conventional rail. Bottom retainers or hook portions of retainers 62 are positioned below the rollers 70 and cooperate with an outwardly projecting flange on the car (not illustrated) to prevent outward displacement of the door.

Figure 4A:
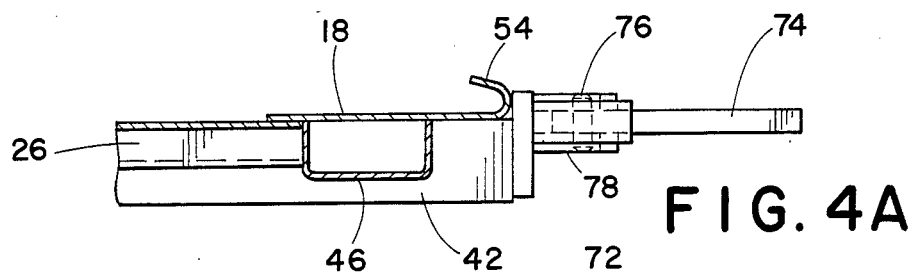
FIG. 4A is an enlarged bottom plan view of the lower right-hand corner portion of the rail car door shown in FIG. 1.
Figure 4B:
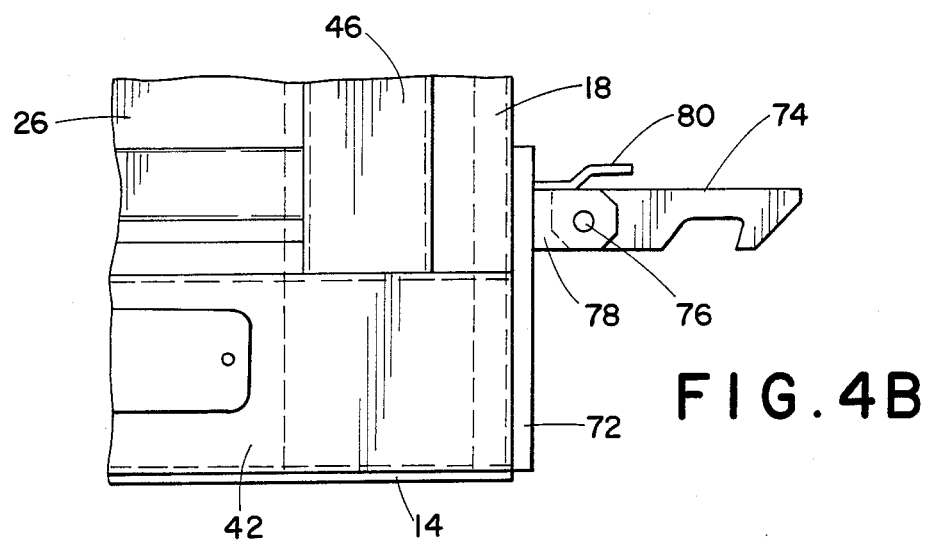
FIG. 4B is a front elevational view of the door section shown in FIG. 4A.

With reference now to FIGS. 4A and 4B, a bottom closure plate 72 is provided along the side edge of the door for closing off the bottom reinforcing channel member 42. A hook 74 is pivotally mounted as at 76 to a bracket 78 secured to the bottom closure plate 72. Hook 74 cooperates with a suitably shaped projection on the car (not illustrated) for holding the door in an open position. A suitable leaf spring 80 or the like normally biases the hook in a clockwise or downward direction in the view of FIG. 4B to a horizontal position and facilitates selective upward pivotal movement of the hook thereagainst.

Figure 5A:
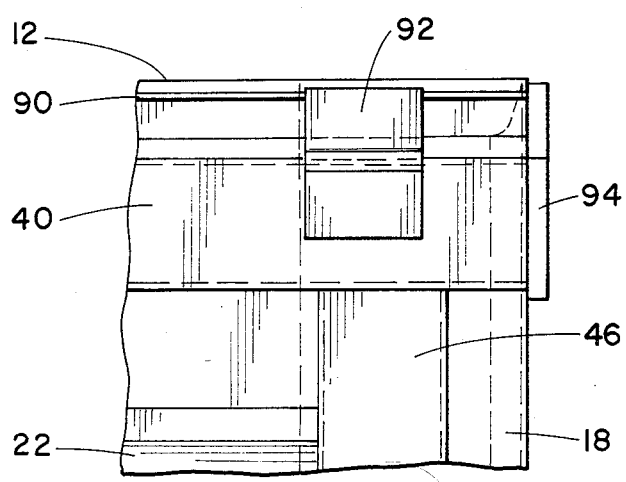
FIG. 5A is an enlarged front elevational view of the upper right-hand corner portion of the rail car door shown in FIG. 1.
Figure 5B:
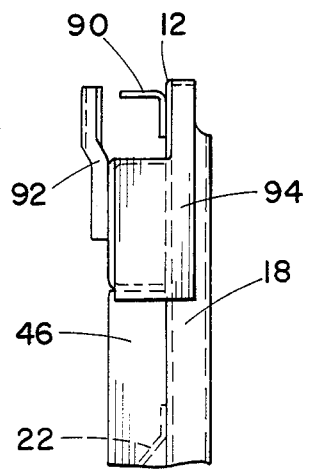
FIG. 5B is a side elevational view of the door section shown in FIG. 5A.

With reference now to FIGS. 5A and 5B, a top retainer 90 is secured to the top frame member 12 and a top edge angle 92 is secured to the top reinforcing channel 40. These two members 90, 92 cooperate to retain the top edge of the door in a suitable conventional track (not illustrated) provided on the car. A top closure plate 94 is provided along the right edge of the top reinforcing member 40.

As is evident from the views of 4A and 5A, the top and bottom reinforcing channels 40, 42 extend over the second side reinforcing channel 46 to the edge of the door. The top and bottom reinforcing channels 40, 42 also extend over the first side reinforcing channel 44 in a similar manner. These relationships help to stiffen the door and better absorb or distribute impact loads. That is, when the door is opened, door stops act against the door at the area of plates 94, 72 which are associated with top frame member 12 and reinforcing channel 40 and with bottom frame member 14 and reinforcing channel 42, respectively. Because impact loads imparted to the door by engagement with the door stops is directed to the horizontal frame members and reinforcing channels instead of to the vertical side frame members as was the case with prior art constructions, the impact forces are better distributed throughout the entire door structure instead of being substantially isolated at the vertical frame members.

With reference again to FIG. 2, an additional reinforcing member 96 may be welded across one of the corrugations 28 in one of the panel members 22, 24, 26 if so desired. Such reinforcing member 96 will stiffen the panel assembly 20 in that area to further enhance the overall strength of the door.

It can be seen that the bottom frame member 14 extends upwardly past the bottom corrugation 28 of the lower corrugated panel 26. Panel 26 is welded to the frame member along both sides of the corrugation 28 to add stiffness to the bottom portion of the door since it is this portion which is closest to the rail car floor and is the most likely area of the door to undergo impact loads. Such loads include trucks backing into the door, forklifts or other material handling equipment striking the door, or heavy items striking the door when they are being loaded or unloaded.

As mentioned, the door body is reinforced by the four reinforcing channel members 40, 42, 44, 46 and it can be further reinforced by one or more reinforcing plates 96 shown in FIG. 2. This construction eliminates the requirement of expensive dies for distorting the panels into reinforcing conformations. The door of the present invention may thus be formed readily in any well-equipped metal workshop such as is maintained by railroads generally and may be readily applied to an angular framework such as has been commonly used in riveted doors of the prior art. By means of modern welding equipment, the various component parts of the door may be securely affixed to each other by spaced weld lines which can be continuous or intermittent. Such welding can be done by hand or by robotic equipment.

It is highly desirable to keep the weight of railroad car doors to a minimum and yet the doors must be rigid enough to withstand forces applied thereto in service. The present invention provides a simple and easily formed and assembled car door which possesses the necessary rigidity without being unduly heavy.

In the preferred embodiment of the invention, all of the framing members and the reinforcing channels are made of ten (10) gauge steel. Panel assembly 20 is made of fourteen (14) gauge steel. This new door has the strength of prior art doors which were conventionally made of five different gauges or thicknesses of steel. At the same time, the subject new door is somewhat lighter than the prior art door constructions.

The number of assembly steps necessary to manufacture a rail car door according to the present invention is considerably less than was necessary with conventional rail car doors since the number of die operations has been decreased. In conventional doors as many as seven or eight die operations were sometimes necessary. On the other hand, only three die operations are needed when practicing the subject invention. The rear or second side frame member hook 54 is formed in one die operation, and all the other framing and reinforcing members are formed in a second die operation. Finally, the corrugated panel structure is formed in a third die operation.

With reference now to the alternate embodiment shown in FIG. 6, the invention is there shown as using a different type of corrugated panel. For ease of illustration and appreciation of this alternative, like components are identified by like numerals with a primed (') suffix and new components are identified by new numerals.

In this FIGURE, the door A' also has a frame 10' including opposed top and bottom frame members 12', 14' and opposed side frame members (not shown). The door is similarly provided with a corrugated panel structure 20'. In this embodiment, however, the corrugated panel structure includes one or more panels having a different type of corrugation 28'. The corrugations 28 of the preferred embodiment are generally V-shaped, whereas the corrugations 28' of the alternate embodiment are more generally channel-shaped. The door is also provided with top and bottom reinforcing channels 40', 42' as well as side reinforcing frame members similar to the embodiment described with reference to FIGS. 1-5. These side reinforcing members are not visible in FIG. 6.

It should be noted that in the embodiment of FIG. 6, the bottom reinforcing channel 42' is somewhat shallower than was the bottom reinforcing channel 42 of the preferred embodiment. For this reason, the retainer member 62' of the FIG. 6 embodiment is welded to the outside of the reinforcing channel 42' in the manner shown. The bottom frame member 14' extends past the first full corrugation 28' of the panel structure 20' so as to afford increased stiffness for the bottom portion of the door to realize those advantages described hereinabove with reference to the preferred embodiment.

Referring specifically to FIGS. 7 and 8, the two different types of corrugated panel members are shown in a side-by-side relationship. The corrugated panel assembly 20 of the preferred embodiment has generally V-shaped corrugations 28 wherein each corrugation is comprised of a flat first side 100 and a flat second side 102. These corrugations jut outwardly from a panel base portion 104 at laterally spaced apart intervals. It will be seen that most of the panel material lies to the right of a plane D—D which bisects the panel through the thickness dimension thereof.

In the corrugated panel assembly 20' of FIG. 8, corrugations 28' are configured and arranged to define alternating, generally U-shaped channels 106, 108 disposed in a facing relationship with each other. Thus, each of channels 106, 108 extends along an opposing face of the panel. Preferably, channels 106, 108 each have a flat first side 110, a flat base portion 112 and a flat second side 114. Each of sides 110, 114 is common to adjacent ones of corrugations 106, 108. It should be noted, however, that other types of suitable corrugations could also be formed in the panel assembly 20'.

The corrugations of FIG. 8 are considerably larger than the corrugations of FIG. 7 and are so designed that approximately half of the panel material is disposed on either side of a plane E—E which bisects the panel thickness dimension. Thus, the alternating, generally U-shaped channels 106, 108 are disposed equal distances from the plane E—E. In this manner, the door construction is "balanced" and has been found to be considerably stronger than conventional rail car doors. Indeed, it has been found that such a balanced door can withstand internal loads of approximately four (4) pounds per square inch without buckling. The increased strength of the panel assembly is realized from the fact that channel shaped corrugations 106, 108 extend oppositely outward from plane E—E by equal distances. Such relationship causes the strength characteristics of the basic panel structure to be enhanced.

With reference now to FIGS. 9-11, the door of the present invention includes hasp assembly 58 which utilizes a novel hasp securing member 120. The hasp securing member is generally U-shaped and has a pair of threaded end portions or studs 122, 124 as well as a central body portion 126. It should be noted that the central body portion is somewhat larger in diameter than end portions 122, 124. The end portions are insertable through suitably sized and located apertures in the door panel assembly. Body portion 126 forms shoulders 128 adjacent the end portions 122, 124 to positively locate the securing member 120 against the panel assembly. The member 120 is secured to the door by suitable means such as nuts 130, 132 received on threaded end portions 122, 124. A reinforcing plate 140 which is provided with suitably spaced apertures 142, 144 may be positioned between a back side 146 of the panel assembly 20 and nuts 130, 132 to strengthen the overall assembly.

The above arrangement has been found to be considerably easier to remove from rail car door A when and as it becomes necessary to replace a hasp 150 which has been damaged or broken. This result occurs since the hasp securing member 120 can be detached from the door simply by unthreading the two nuts 130, 132. Subsequently, the broken hasp may be replaced by unhooking its eye portion 154 from the securing member 120, placing a new hasp on the securing member, and reinstalling the securing member on the door.

In the prior art arrangement shown in FIG. 9, a series of rivets 156 and weld beads 158 were used to secure the conventional hasp securing member 152 to the rail car door. The disadvantage of this structure resides in the difficulties presented when it is desired to detach the hasp securing member from the rail car door. What generally happened, therefore, was that either the hasp or the hasp securing member was cut apart. Employing either of these steps made it considerably more difficult and time consuming to replace a broken hasp.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A rail car sliding door comprising:
   a rectangular frame including a pair of opposed side frame members and opposed top and bottom frame members, said frame members being fixedly secured to each other;
   at least one panel including a plurality of spaced-apart corrugations, said corrugations extending over the entire panel from one terminal edge to another terminal edge of said panel, said panel secured to said frame so as to extend between a pair of opposed frame members; and, top, bottom, and side reinforcing channels located outwardly of said corrugated panel and having free edges secured to respective ones of said frame members to strengthen the door, wherein said side reinforcing channels are spaced inwardly from side edges of the door and said top and bottom reinforcing channels extend over said side frame reinforcing channels to said side edges of said door for enhancing the load bearing characteristics of said door.

2. The rail car door of claim 1 wherein said bottom frame member overlaps and is secured to a lowermost corrugation to provide a second reinforcement channel along a bottom portion of the door.

3. The rail car door of claim 1 further including an elongated metal plate secured to one of said panel corrugations to define an additional reinforcing channel for further strengthening the door in that area.

4. The rail car door of claim 1 wherein said at least one panel has a plurality of corrugations which are so configured that generally equal amounts of panel material are provided on each side of a plane bisecting the door thickness dimension.

5. The rail door of claim 1 wherein said frame members, panel, and reinforcing channels are constructed of metal and are fixedly secured to each other at welded connection areas.

6. The rail door of claim 1 further including a hasp assembly for retaining the door in a closed position, said assembly including a hasp securing member affixed to said door, and a hasp pivotally mounted on said hasp securing member adapted for cooperation with an associated hasp locking device mounted on the associated rail car.

7. The rail car door of claim 6 wherein said hasp securing member includes a U-shaped body having a generally straight central portion and a pair of end portions extending from said central portion at the opposite end areas thereof, said end portions having means for retainingly receiving locking members thereon and being adapted to extend through the door for securing thereto by said locking members.

8. The rail car door of claim 7 wherein said means for retainingly receiving locking members includes threaded end portions and wherein nut means are threadably received by said end portions to accommodate selective removal of said hasp securing member from association with the door.

9. The rail car door of claim 8 wherein said hasp securing member further includes a plate interposed between an inner side of said door and said nut means, said plate having apertures for accommodating passages of said threaded end portions therethrough.

10. A metal rail car sliding door comprising:
a rectangular frame defined by a pair of planar side frame members and planar top and bottom members, said members being welded to each other;
at least one corrugated metal panel having plural corrugations extending from one terminal edge to another terminal edge of said panel, said panel being welded to said frame;
top and bottom generally U-shaped reinforcing channels each having spaced parallel free edges, said top and bottom reinforcing channels being welded to said top and bottom frame members along said free edges to extend generally coextensive therewith; and,
a pair of generally U-shaped side reinforcing channels each having spaced parallel free edges, said side reinforcing channels each being welded to a respective one of said side frame members along said free edges to extend generally coextensive therewith, said top, bottom, and side reinforcing channels strengthening the door and said top and bottom reinforcing channels extending over said side reinforcing channels to side edges of the door for enhancing the load bearing characteristics of said door.

11. The door of claim 10 wherein said panel includes a plurality of laterally spaced apart corrugations extending thereacross.

12. The door of claim 11 wherein said corrugations are generally V-shaped and extend outwardly from a base portion of said panel.

13. The door of claim 11 wherein each of said corrugations is generally channel-shaped and is defined by a pair of side walls interconnected by a bottom wall.

14. The door of claim 13 wherein alternating ones of said corrugations extend oppositely outward from opposed faces of said panel.

15. The door of claim 13 wherein said corrugations are so spaced on said base panel that generally equal amounts of panel material are provided on each side of a plane bisecting the thickness dimension of said door.

16. A strengthened rail car door slidably mounted on a rail car comprising:
a rectangular frame having a pair of opposed, generally planar frame members and opposed, generally planar top and bottom members, said frame members being fixedly secured to each other by welding at interconnection areas;
at least one corrugated metal panel fixedly secured to said frame and including a plurality of corrugations which extend completely between opposed terminal edges of said panel, each of said corrugations being generally U-shaped and defined by a pair of side walls interconnected by a bottom wall, alternating ones of said corrugations extending oppositely outward from opposed faces of said panel so that generally equal amounts of door material may be provided on each side of a plane bisecting the door thickness dimension;
top and bottom generally U-shaped reinforcing channels fixedly secured to said top and bottom frame members, and a pair of generally U-shaped side reinforcing channels secured to said side frame members, said top, bottom, and side channels strengthening the door with said side channels spaced inwardly from side edges of the door and said top and bottom channels extending over said side channels to said side edges of the door to enhance the load bearing characteristics of said door; and,
at least one peripheral corrugation completely enclosed by a frame member to add stiffness to the door.

17. The door of claim 16 wherein said corrugations extend between said side frame members, and said bottom frame member overlaps and is secured to a lowermost corrugation to provide a reinforcing channel along a bottom portion of the door.

18. The door of claim 16 further including a generally U-shaped hasp securing member affixed to the door, and a hasp pivotally mounted on said hasp securing member adapted for cooperation with an associated hasp locking device mounted on the associated rail car.

19. The door of claim 18 wherein said hasp securing member has a generally straight central portion and a pair of end portions extending from said central portion at the opposite ends thereof in parallel relation to each other, said end portions being threaded and adapted to receive an associated nut.

* * * * *